Sept. 19, 1961 H. C. McCURDY 3,000,362

TRACER MECHANISM

Original Filed Feb. 25, 1957 10 Sheets-Sheet 1

INVENTOR.
HARRY C. McCURDY
BY Schmieding and Fultz
ATTORNEYS

INVENTOR.
HARRY C. McCURDY
BY
Schmieding and Fultz
ATTORNEYS

Sept. 19, 1961 H. C. McCURDY 3,000,362

TRACER MECHANISM

Original Filed Feb. 25, 1957 10 Sheets-Sheet 3

INVENTOR.
HARRY C. McCURDY
BY Schmieding and Fultz
ATTORNEYS

INVENTOR.
HARRY C. McCURDY
BY Schmieding and Fultz
ATTORNEYS

Sept. 19, 1961 H. C. McCURDY 3,000,362

TRACER MECHANISM

Original Filed Feb. 25, 1957 10 Sheets-Sheet 5

INVENTOR.
HARRY C. McCURDY
BY
Schmieding and Fultz
ATTORNEYS

INVENTOR.
HARRY C. McCURDY
BY Schmieding and Fultz
ATTORNEYS

Sept. 19, 1961 H. C. McCURDY 3,000,362

TRACER MECHANISM

Original Filed Feb. 25, 1957 10 Sheets-Sheet 7

INVENTOR.
HARRY C. McCURDY
BY
Schmieding and Fultz
ATTORNEYS

INVENTOR.
HARRY C. McCURDY
BY
Schmieding and Fultz
ATTORNEYS

INVENTOR.
HARRY C. McCURDY
BY
Schmieding and Fultz
ATTORNEYS

Sept. 19, 1961

H. C. McCURDY 3,000,362

TRACER MECHANISM

Original Filed Feb. 25, 1957

10 Sheets-Sheet 10

INVENTOR.
HARRY C. McCURDY
BY
Schmieding and Fultz
ATTORNEYS

United States Patent Office 3,000,362

Patented Sept. 19, 1961

3,000,362

TRACER MECHANISM

Harry C. McCurdy, deceased, late of Zanesville, Ohio, by Ruth L. McCurdy, administratrix, Zanesville, Ohio; said Harry C. McCurdy assignor to The R. K. Le Blond Machine Tool Company, Cincinnati, Ohio, a corporation of Delaware Continuation of abandoned application Ser. No. 642,212, Feb. 25, 1957. This application Sept. 15, 1960, Ser. No. 56,318

17 Claims. (Cl. 121—45)

This invention relates to tracer mechanisms for establishing the path of a tool in conformity with the shape of a template, and particularly to an improved hydraulic control apparatus for such mechanisms.

This application is a continuation of co-pending application Serial No. 642,212 filed February 25, 1957, and now abandoned.

In general, the tracer mechanism of the present invention is applicable to machine tools, such as lathes, wherein a work piece is shaped by means of a cutting tool and relative movement must be effected between the tool and work piece in accordance with a specific pattern in order to form the work piece to a desired shape. Such machine tools generally include a carriage which is moved along a path adjacent the work piece and the carriage supports a tool holder and tool that are movable towards and away from the work piece. The mechanism of the present invention includes a fluid motor and associated control apparatus that are mounted on the carriage of the machine tool. The fluid motor is operatively connected to the tool holder for moving same relative to the carriage and work piece and the control apparatus includes contour detection means, such as a stylus in engagement with a template, and serves to control the fluid energy input to the fluid motor whereby the desired path for the cutting tool is dictated by such control apparatus in conformity with the contour sensed by the contour detecting means.

As one aspect of the present invention, the control apparatus for the tracer mechanism incorporates a simplified and novel valve means provided by a valve cylinder containing a normally centered spool that is shiftable in two directions from a centered position. When the spool is in the centered position it serves to prevent the flow of pressurized fluid from a source, such as a pump, to the fluid motor that advances the cutting tool. According to the present invention the spool and associated valve cylinder are constructed so that only a minute displacement of the spool in one direction from center institutes delivery of pressurized fluid to the fluid motor and so that only a minute displacement of the spool in the other direction from center drains fluid from the fluid motor. When such displacement of the spool occurs movement of the cutting tool commences and such movement is caused to occur responsive to even very minute changes in contour being sensed by the contour sensing means. Moreover, only a minute displacement of the spool back to the centered position cuts off the delivery of fluid energy to the fluid motor whereby movement of the cutting tool is caused to cease responsive to very minute changes in contour being sensed by the contour sensing means.

As another aspect of the present invention the valve means of the control apparatus is provided with a novel mechanism that hydraulically imposes a bias on the above mentioned normally centered spool for moving the spool in one direction and for constantly opposing the force exerted on the spool by the contour sensing means which sensing means is arranged to move the spool in the other direction. The force exerted on the spool by such hydraulic bias is of a controlled low magnitude whereby the contour sensing means need only exert a very minute force on the spool to effect movement thereof. With this arrangement extreme sensitivity of response is achieved and the tracer mechanism can very precisely reproduce on the work piece even very minute changes in contour sensed by the contour sensing means.

As still another aspect of the present invention the above mentioned control apparatus is provided with a novel reversing mechanism whereby a single control apparatus can be utilized for forming both external and internal contours on work pieces. Such reversing mechanism can be provided by a multiple port valve plate slideably mounted between the previously mentioned fluid motor and control apparatus. With this arrangement it is only necessary to shift the valve plate between forward and reverse positions in order to change the direction of operation of the control apparatus.

It is therefore an object of the present invention to provide an improved tracer mechanism for reproducing a contour on a work piece, in accordance with a pattern contour sensed by contour sensing means, which mechanism incorporates a control apparatus that is highly sensitive to minute changes in contour whereby the shape of the contour pattern is precisely reproduced on the work piece.

It is another object of the present invention to provide a tracer mechanism of the type described which mechanism incorporates an improved control apparatus of simplified construction that achieves versatile and precise performance with a minimum of component parts.

It is another object of the present invention to provide a tracer mechanism of the type described which mechanism incorporates an improved control apparatus that is readily reversible in operation whereby both external and internal contours can be reproduced with a single mechanism by use of a single template for both boring and turning.

It is another object of the present invention to provide a tracer mechanism of the type described that operates at relatively low fluid pressures and hence low temperatures whereby tolerances between critically located components are maintained and high efficiency of operation is achieved.

It is another object of the present invention to provide a tracer mechanism of the type described that incorporates a control apparatus provided with a novel closed center spool controller that is completely hydraulically balanced and hence readily and rapidly shiftable by a relatively slight force whereby sensitivity of response and hence accuracy in contour duplication are achieved.

It is still another object of the present invention to provide a tracer mechanism of the type described that is not only adapted for conducting both boring and turning operations, but provides the additional advantage that when a boring operation is being conducted the boring tool is retraced or moved rearwardly which is the normal direction of movement for a boring tool on a lathe when a boring operation is being conducted without a tracer mechanism.

Further objects and advantages of the present invention will be apparent from the following description, reference being had to the accompanying drawings wherein a preferred form of embodiment of the invention is clearly shown.

Figure 11:
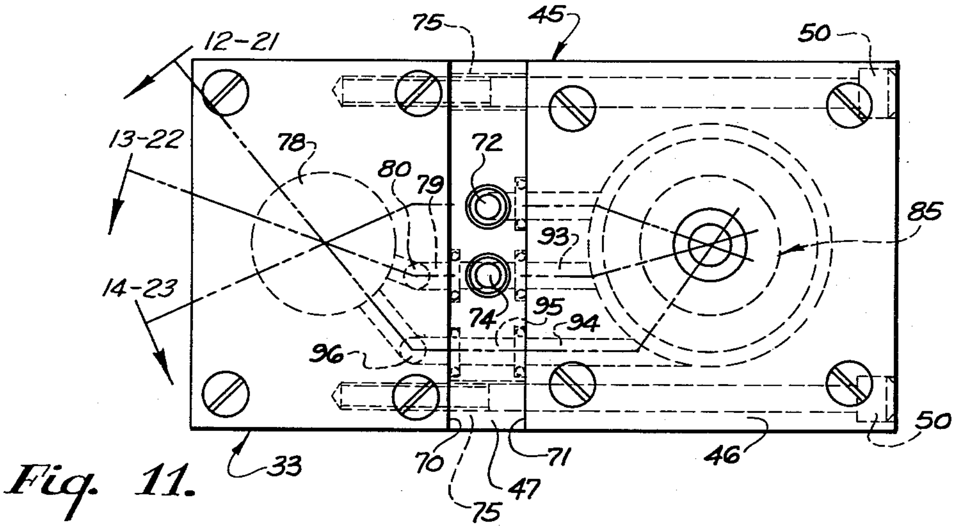
FIG. 11 is a rear view of the fluid motor and control apparatus of the preceding figures showing the locations of the cutting planes for the sectional views of FIGS. 12, 13, and 14.
Figure 21:
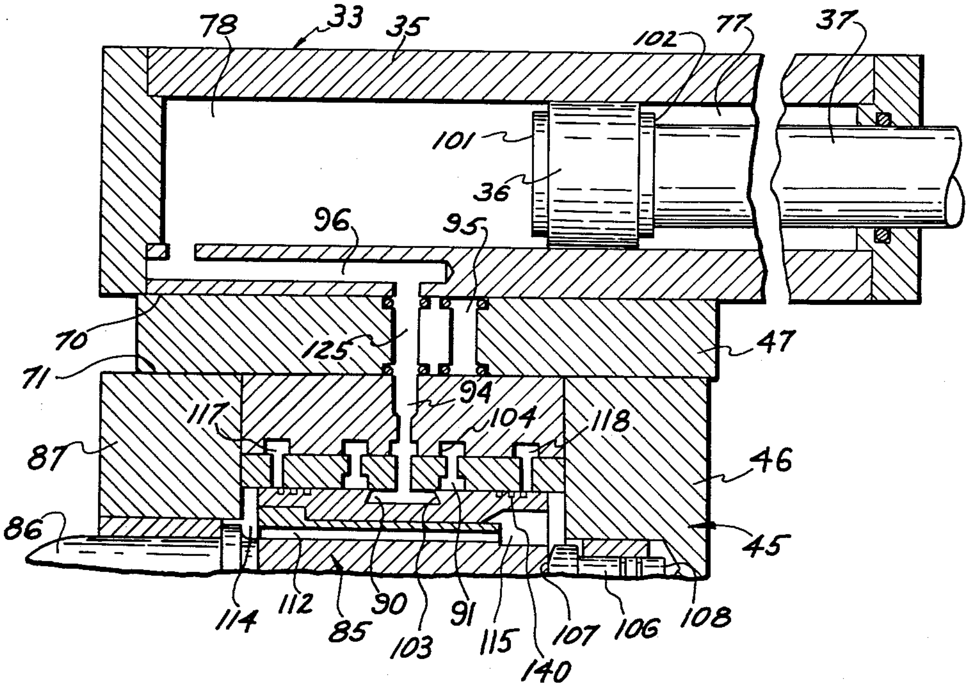
Figure 22:
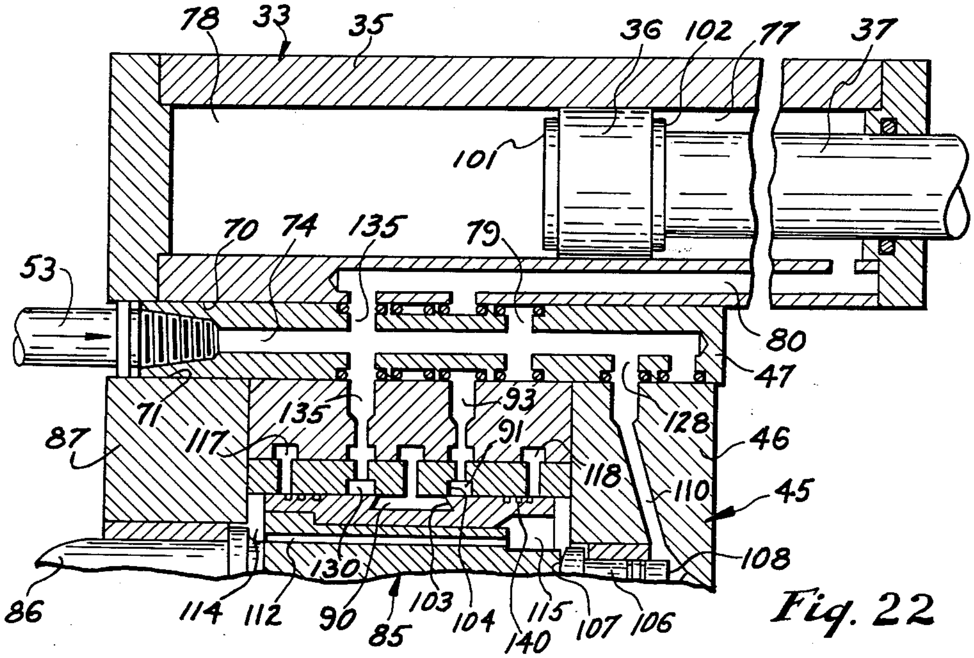
Figure 23:
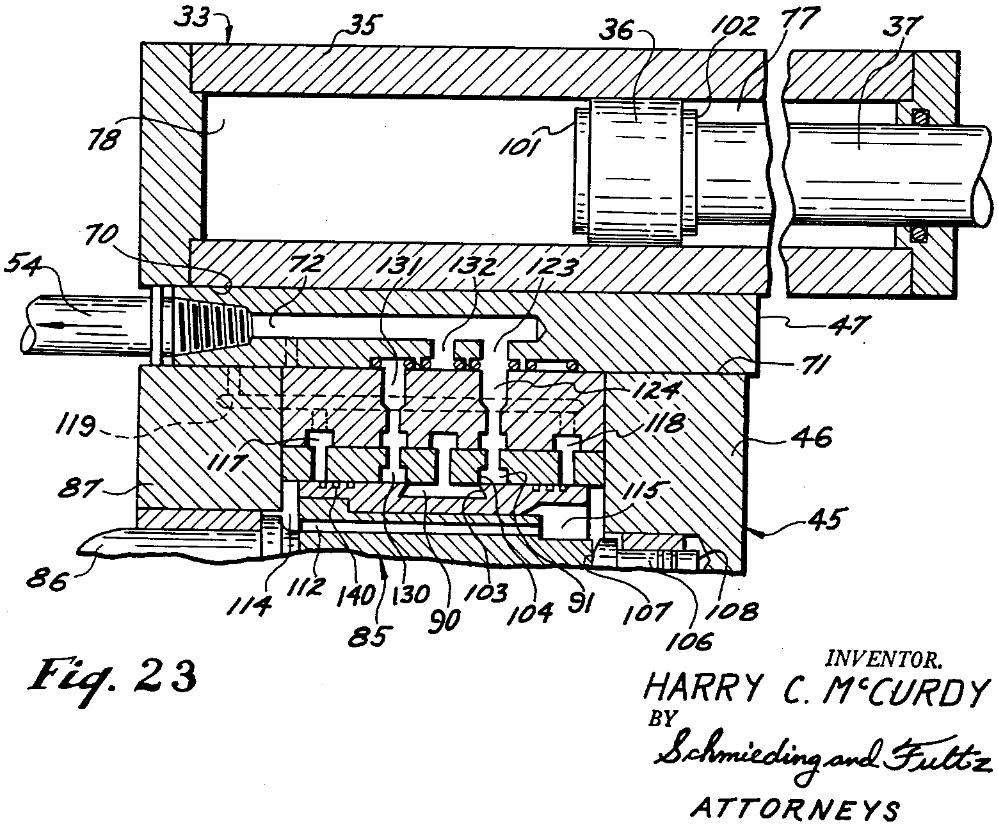

FIGS. 21 through 23 are top sectional views illustrating the fluid motor and control apparatus, of the preceding figures, in a boring position, the figures being taken respectively along the lines 21—21 and 22—22 and 23—23 of FIG. 11.

Figure 1:
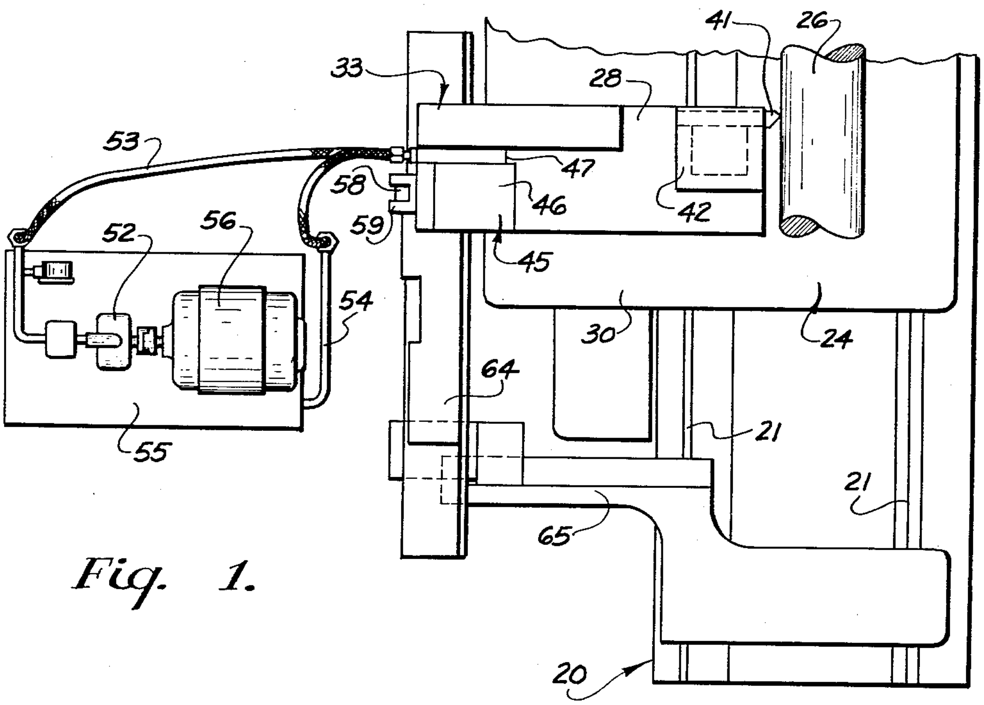
FIG. 1 is a partial plan view of a lathe showing the tracer mechanism of the present invention applied thereto.
Figure 2:
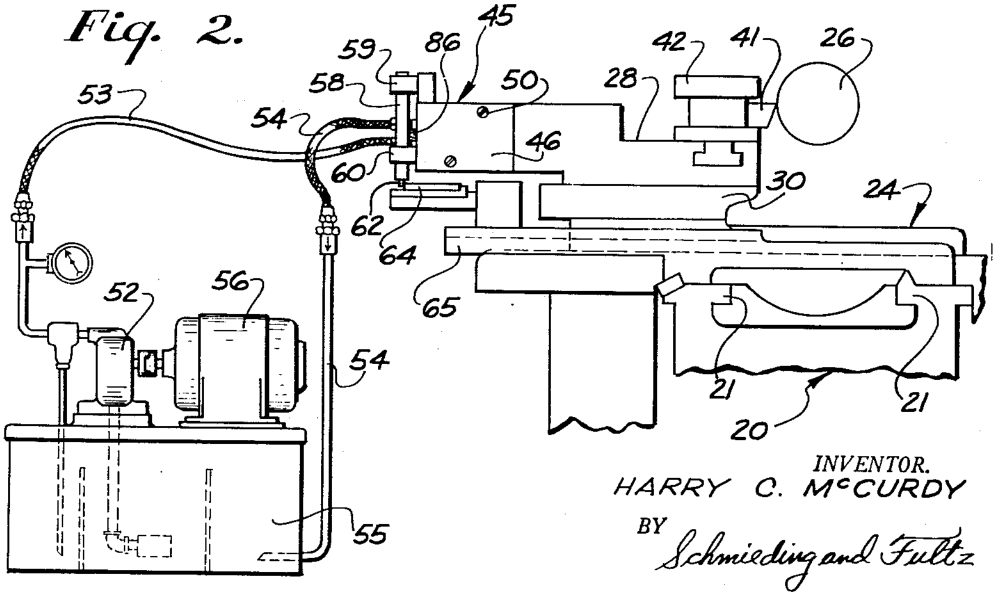
FIG. 2 is a partial side elevational view of the lathe of FIG. 1 showing the tracer mechanism of the present invention applied thereto.

Referring in detail to the drawings, FIGS. 1 and 2 illustrate a lathe, indicated generally at 20, comprising ways 21 forming tracks for a carriage indicated generally at 24. The lathe 20 also includes a conventional head and tail stock, not illustrated, for rotatably supporting a work piece such as rod 26.

Figure 19:
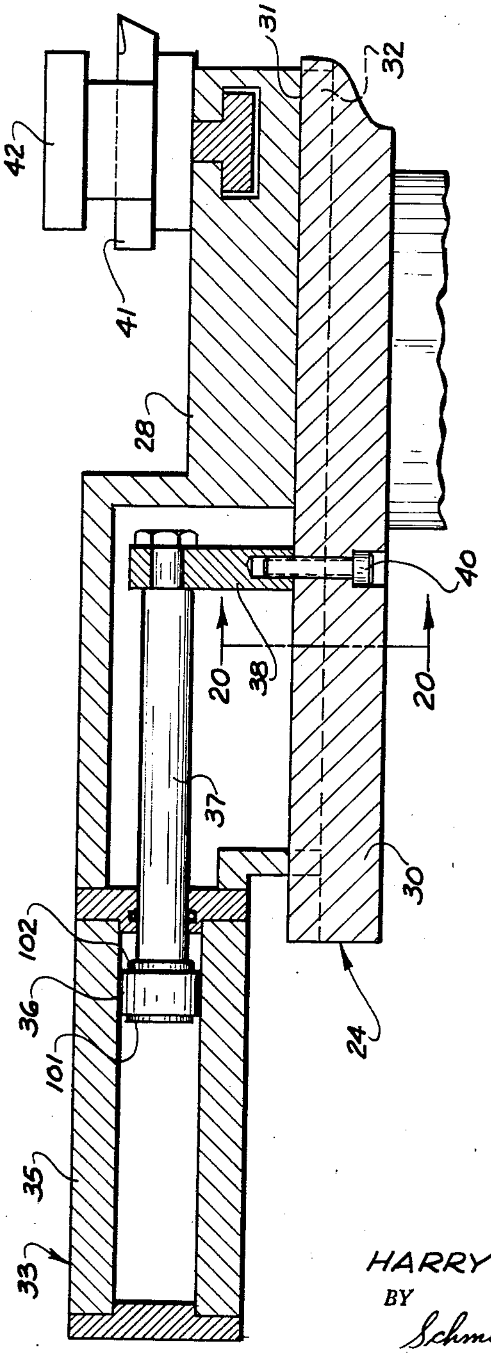
FIG. 19 is a side sectional view showing the carriage of the lathe of FIGS. 1 through 4 and the fluid motor of the apparatus of the present invention, the section being taken along the line 19—19 of FIG. 4.

With reference to FIGS. 1, 2, and 19 carriage 24 includes an upper carriage portion 28 and lower carriage portion 30. Upper carriage portion 28 includes a female dovetail 31 that receives a male dovetail 32 whereby upper carriage portion 28 can be moved towards and away from work piece 26. A fluid motor indicated generally at 33, is supported by carriage 24 and includes a cylinder 35 mounted on upper carriage portion 28 and a piston 36 connected to lower carriage portion 30 by means of a rod 37 and lug 38, the latter having its base bolted to lower carriage portion 30 by screws 40.

With continued reference to FIGS. 1, 2, and 19, upper carriage portion 28 further includes a tool 41 mounted in a tool holder 42. It will be understood that when fluid motor 33 is operated piston 36 and rod 37 remain stationary with respect to lower carriage portion 30 and cylinder 35, upper carriage portion 28, and tool holder 42 move along the dovetail ways 32 as a unit.

Referring again to FIGS. 1 and 2, upper carriage portion 28 carries a control apparatus, indicated generally at 45, that includes a valve body 46 and a valve plate 47. The control apparatus 45 is attached to the side of fluid motor 33 by a plurality of screws 50 best seen in FIGS. 5 and 11. In general, control apparatus 45 serves to control the flow of fluid from a pump 52 via a line 53 to fluid motor 33 and also the flow of fluid from fluid motor 33 via a line 54 to a reservoir 55. A motor 56 is connected to pump 52 for driving same. The specific operation of control apparatus 45 is described in detail later herein.

Referring to FIGS. 1, 2, 5, 6, and 7, valve body 47 carries a stylus 58 pivoted at either an upper pivot mount 59 or a lower pivot mount 60. The lower end of stylus 58 includes a tip 62 arranged to engage the edge of a template 64 mounted on a template carrier 65 which is in turn mounted on the bed of the lathe. When carriage 24 moves along ways 21 stylus 58 is moved along the edge of template 64 whereby the change in contour of template 64 is sensed by the stylus. By appropriate mechanism, later to be described in detail, control apparatus 45 transduces the change in contour signal sensed by stylus 58 into the precise flow control of fluid delivered to or released from fluid motor 33 whereby upper carriage portion 28 is retracted or advanced relative to lower carriage portion 30 as is required to reproduce the contour of template 64 on work piece 26.

Figures 5, 6:
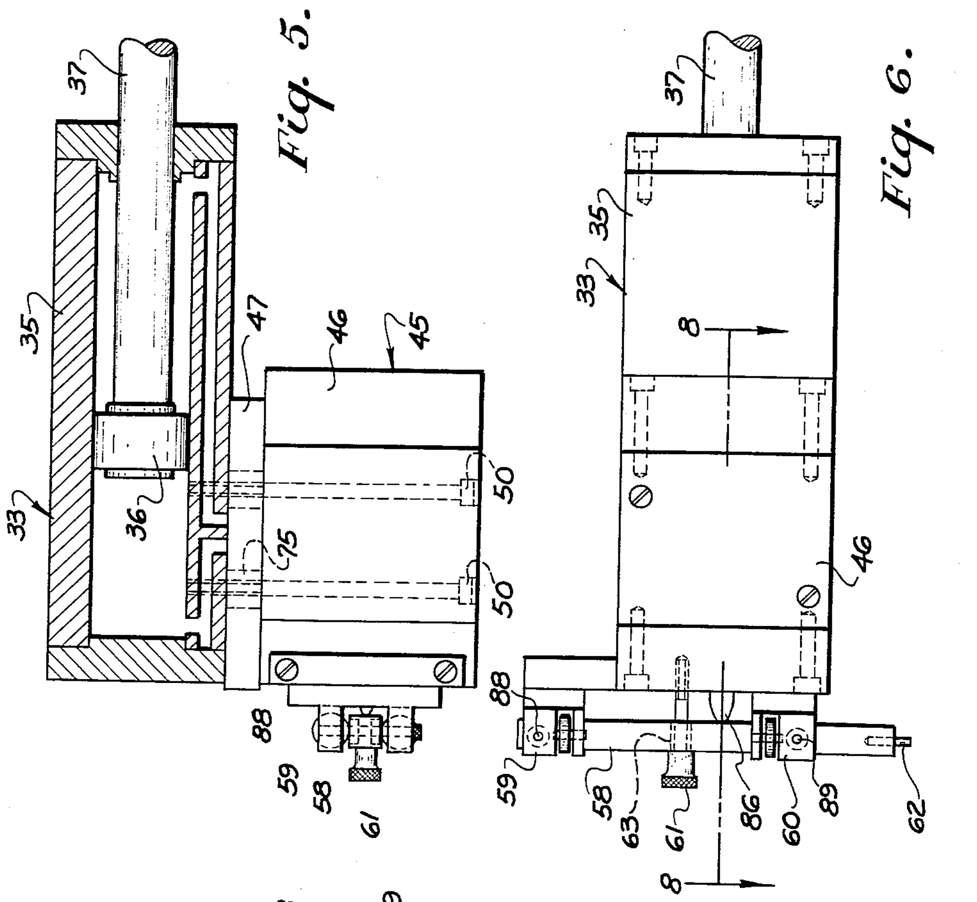
FIG. 5 is a top view partially in section, of a fluid motor and control apparatus comprising a portion of the tracer mechanism of the preceding figures, the section being taken along the line 5—5 of FIG. 7.
FIG. 6 is a side view of the fluid motor and control apparatus of FIG. 5.
Figure 7:
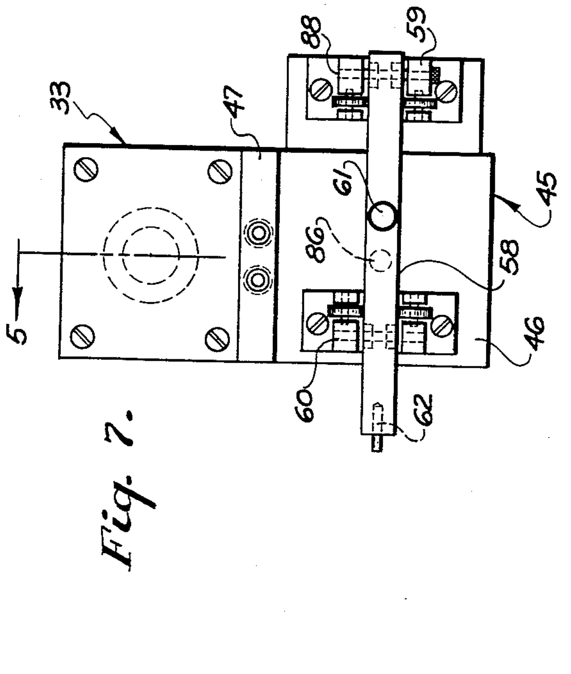
FIG. 7 is a rear view of the fluid motor and control apparatus of FIGS. 5 and 6.
Figure 8:
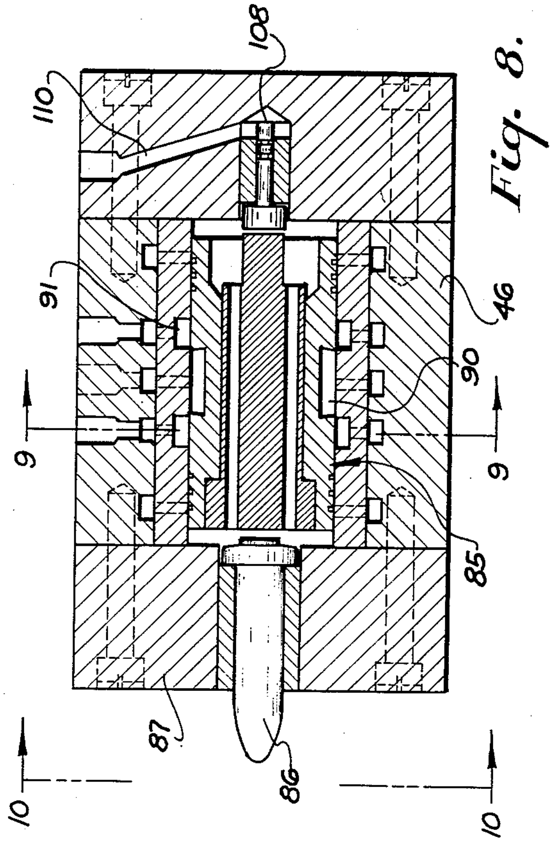
FIG. 8 is a top sectional view of the control apparatus of the preceding figures, the section being taken along the line 8—8 of FIG. 6.
Figure 9:
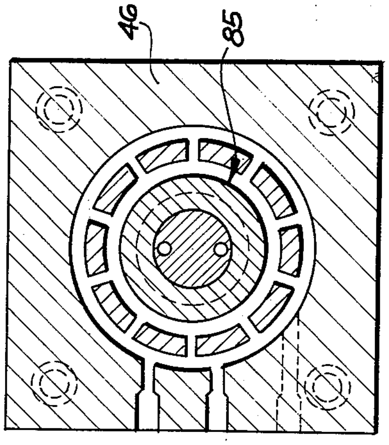
FIG. 9 is a rear sectional view of the control apparatus of FIG. 8, the section being taken along the line 9—9 of FIG. 8.
Figure 10:
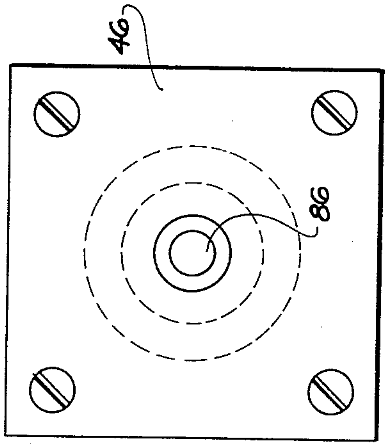
FIG. 10 is a rear view of the control apparatus of FIGS. 8 and 9, the view being taken along the line 10—10 of FIG. 8.

As is best seen in FIGS. 5 through 7, stylus 58 is provided with a guide pin 61 extended through a hole 63 in the stylus and mounted in a threaded hole in valve body 46.

Figure 3:
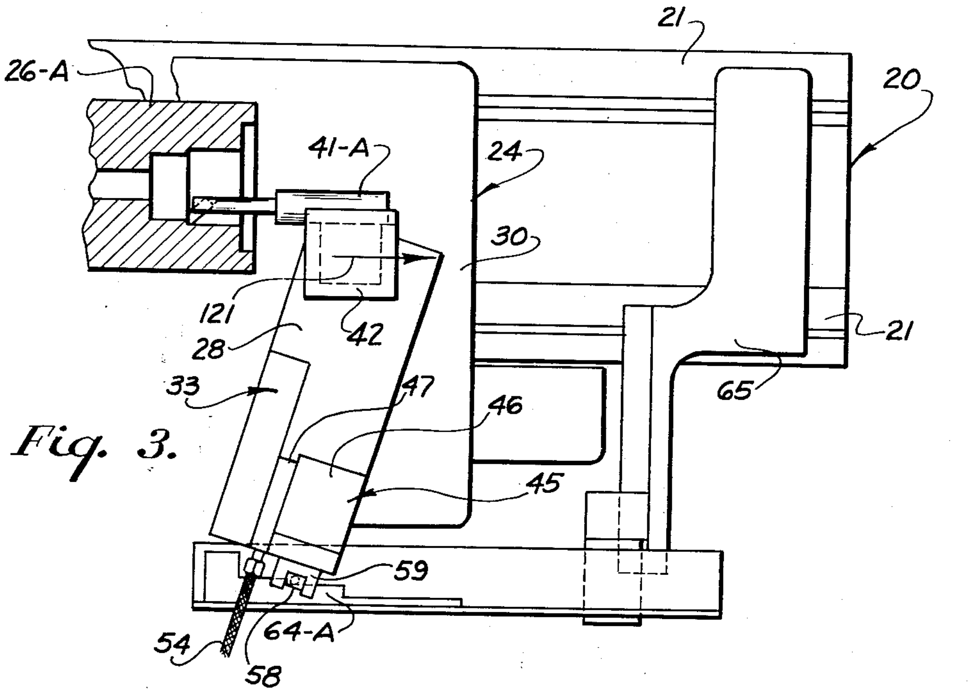
FIG. 3 is a plan view of the lathe of the preceding figures showing the tracer mechanism of the present invention set up for reproducing an internal contour as required for a boring operation.

Reference is next made to FIGS. 11 through 14 for purposes of describing the novel control apparatus 45 of the present invention. Such apparatus includes valve plate 47 that can be shifted from a rear position, illustrated in FIGS. 12 through 14, to a forward position, not illustrated. It should be pointed out that when valve plate 47 is in the rear position the control apparatus is set up for retracting upper carriage portion 28 and tool 41 relative to a work piece 26, FIG. 1, or work piece 21–B, FIG. 30. FIGS. 1 and 3 illustrate turning operations wherein exterior contours are being formed.

As an alternative set up for boring interior contours, FIG. 2, valve plate 47 is shifted to a forward position, not illustrated, wherein control apparatus 45 serves to retract upper carriage portion 28 and a boring tool 41–A relative to a work piece 26–A.

Figure 12:
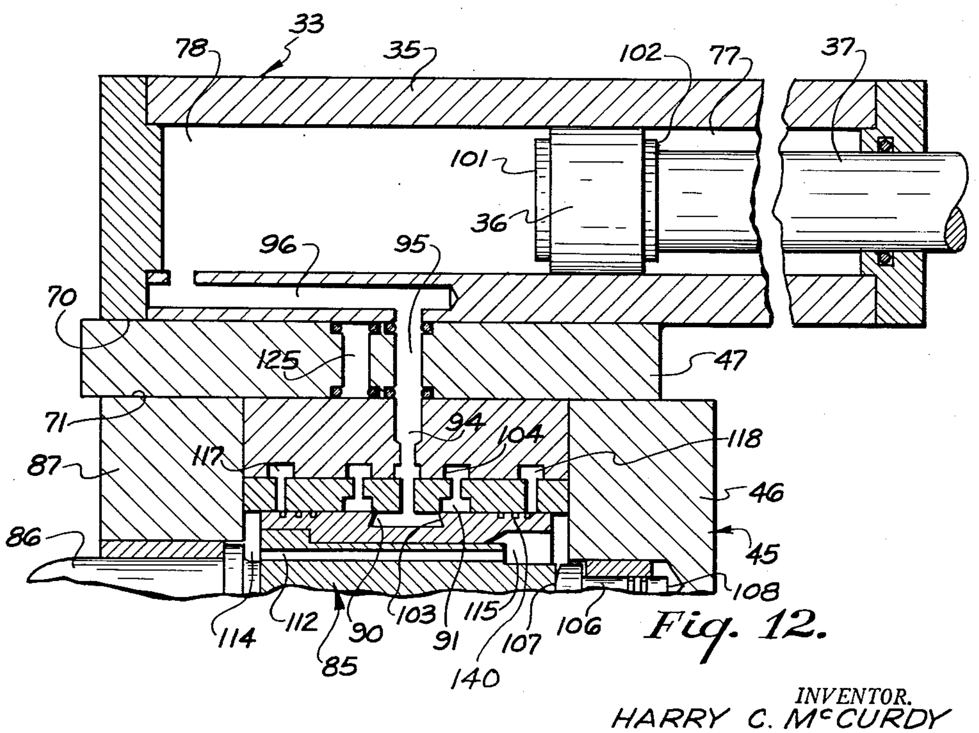
FIG. 12 is a top sectional view of the fluid motor and control apparatus of the preceding figures, the section being taken along the line 12—12 of FIG. 11 so as to show certain fluid passage connections between said fluid motor and control apparatus.
Figure 13:
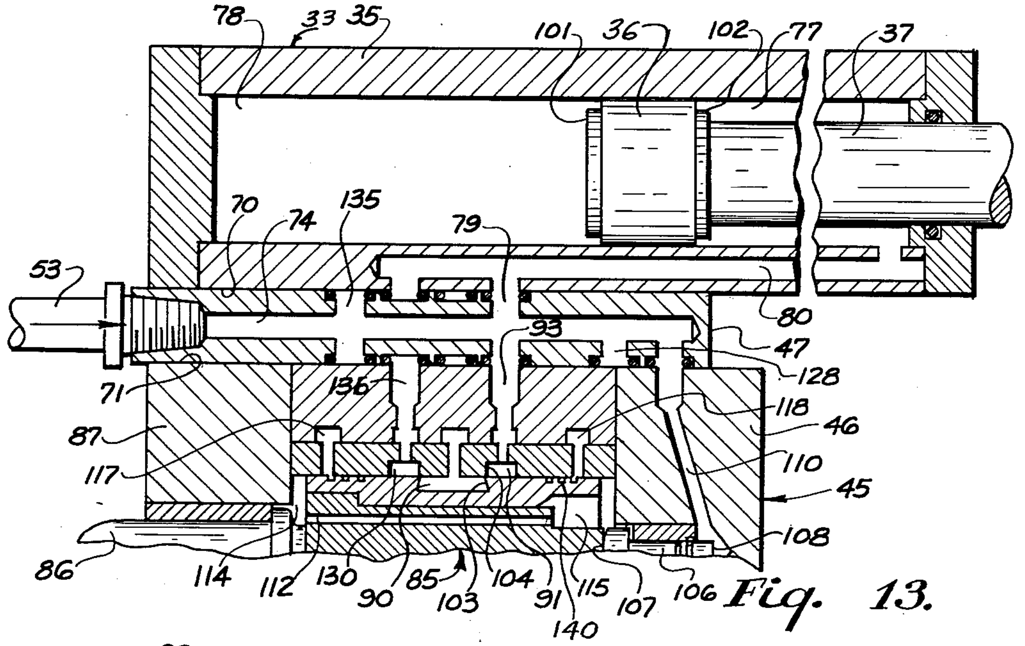
FIG. 13 is a second top sectional view of the apparatus of FIG. 12, the section being taken along the line 13—13 of FIG. 11 so as to show certain other fluid passage connections between the fluid motor and control apparatus.
Figure 14:
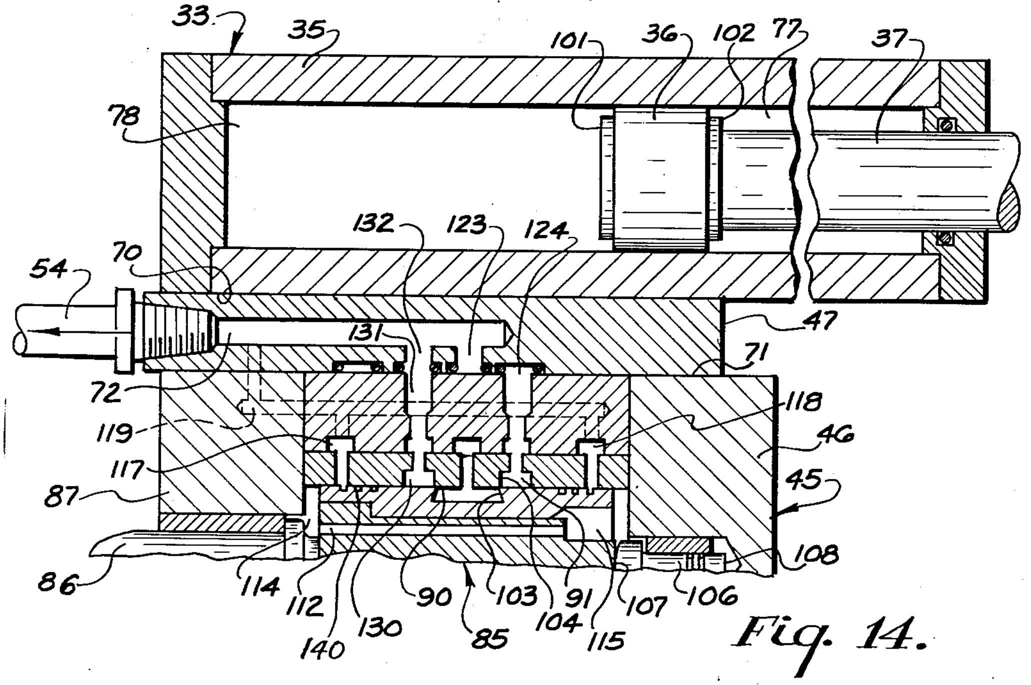
FIG. 14 is a third top sectional view of the apparatus of FIG. 12, the section being taken along the line 14—14 of FIG. 11 so as to show still other fluid passage connections between the fluid motor and control apparatus.
Figure 16:
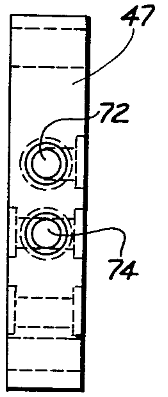
FIG. 16 is a rear view of the valve plate of FIG. 15.
Figure 15:
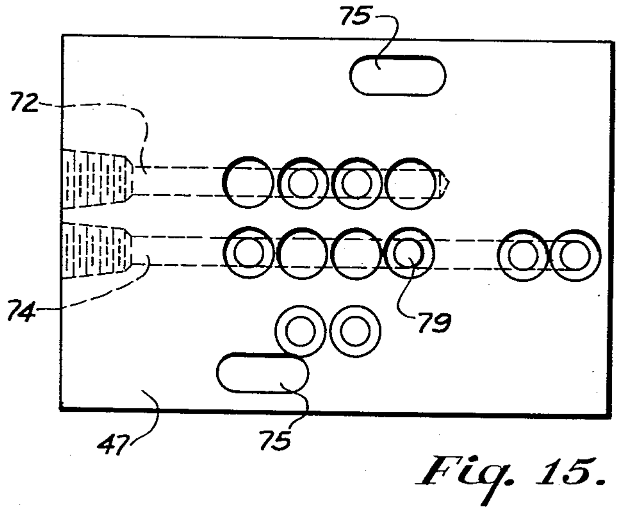
FIG. 15 is a side view of a valve plate comprising a portion of the control apparatus of the preceding figures.
Figure 18:
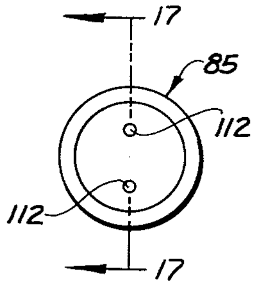
FIG. 18 is an end view of the spool of FIG. 17.

It should be also pointed out that in shifting valve plate 47 between the above mentioned rearward turning position, illustrated in FIGS. 12 through 14, and the forward boring position, not illustrated, the valve body 46 and cylinder 35 are never moved relative to one another but the valve plate 47 is merely shifted forwardly or rearwardly between side walls 70 and 71 of cylinder 35 and valve body 46, respectively.

With particular reference to FIGS. 11 through 18 the operation of the mechanism in turning exterior contours will next be described in detail. Valve plate 47 includes two slots 75, FIG. 15, through which the shanks of the previously mentioned screws 50, FIGS. 5 and 11, are extended whereby the plate can be selectively positioned between the rear and front positions previously described.

Valve plate 47 further includes a longitudinal pressurized passage 74, FIGS. 11 and 13, that communicates with line 53 from pump 52, and also a longitudinal drain passage 72, FIGS. 12 and 14, that communicates with reservoir 55 via line 54, FIG. 2.

With particular reference to FIG. 13, it should be pointed out that the rod end or front of piston 36 and also chamber 77 are always pressurized from longitudinal pressurized passage 74 via passages 79 and 80. When fluid is added to chamber 78 the differential in areas between the front or rod end 102 and the rear end 101 of piston 36 causes retraction of cylinder 35 and upper carriage portion 28 relative to stationary piston 36 and lower carrriage portion 30.

Figure 4:
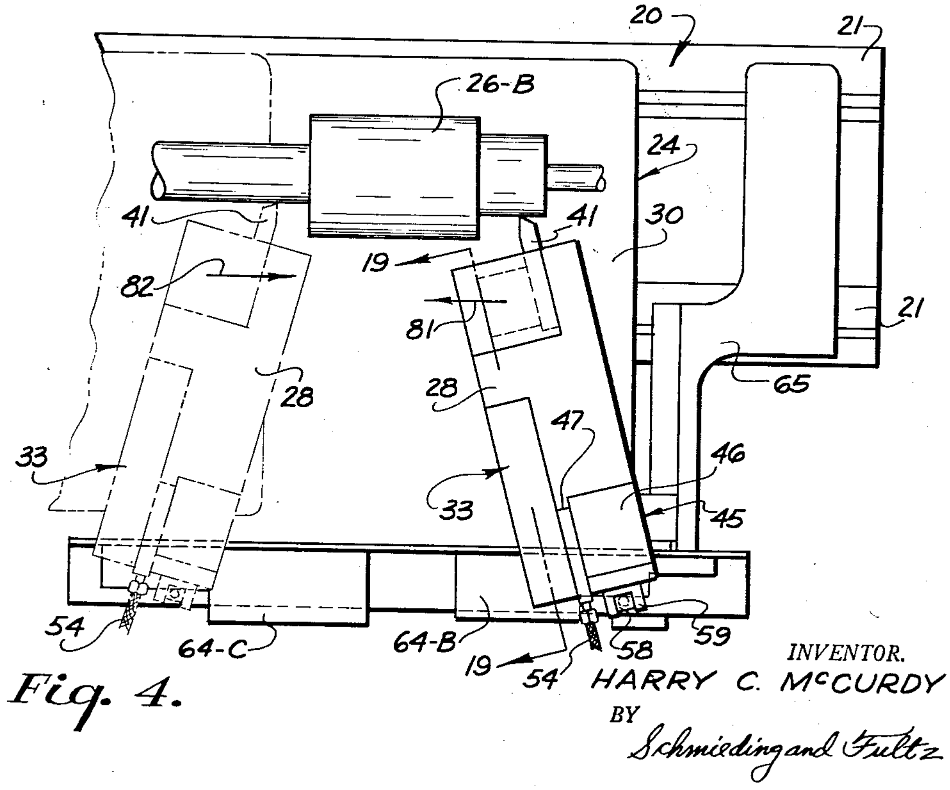
FIG. 4 is a plan view of the lathe of the preceding figures showing the tracer mechanism of the present invention set up for reproducing an external contour as required for a turning operation.

Reference is next made to FIG. 4 which illustrates both right and left carriage feeds for the turning operation. The proper angular inclinations of upper carriage portion 28 relative to templates 64–B and 64–C for each of the directions of carriage movement are illustrated. Arrow 81 indicates left hand carriage feed and arrow 82 indicates right hand carriage feed. It will be noted that in each instance cylinder 33, upper carriage portion 28 and tool 41 are retracted relative to work piece 26–B. Hence it will be understood that fluid must be added to chamber 78, FIGS. 12 through 14, in order to retract tool 41 when turning exterior contours as shown in FIG. 4.

The addition or release of fluid to or from chamber 78 is accomplished by means of a balanced spool indicated generally at 85, FIGS. 8, 9, and 11 through 14. Spool 85 is illustrated in its center position in FIGS. 12 through 14 and is shifted to the right by means of a plunger 86 slideably carried in the left end plate 87 of valve body 46. As is best seen in FIGS. 5 through 7, the outer end of plunger 86 is engaged by stylus 58.

It will be noted from FIGS. 12 through 14 that when spool 85 is in a centered position a right edge 103 of spool 85 lies only a minute distance to the left of a left edge 104 of annular passage 91 when the spool is centered. Hence only a very minute change in contour on template 64–B or 64–C, FIG. 4, will connect neck 90 with annular passage 91 whereby fluid motor 33 is energized and tool 41 is retracted. It will be understood that the extreme sensitivity of control apparatus 45 and the precision in contour duplication achieved by the mechanism result from the minute distance separating edge 103 on the spool from edge 104 on the valve body. Very precise operation has been achieved where the minute distance between edges 103 and 104 when the spool is centered has a dimension of seven tenths of a thousandth of an inch.

As is best seen in FIG. 13, small piston 106 is slideably carried in the right end of valve body 46. The left end 107 of small piston 106 engages the right end of spool 85 and the right end 108 of small piston 106 is exposed to pressurized fluid from a passage 110 in valve body 46 which passage communicates with longitudinal pressurized passage 74 in valve plate 47. It will be noted that right end surface 108 of small piston 106 is of relatively small area whereby the force exerted by small piston 106 on spool 85 is of a very low magnitude. Hence only a very small force need be exerted on stylus 58 by template 64–B or 64–C in order to effect shifting of spool 85 and energization of fluid motor 33. It has been found that very sensitive and satisfactory operation of the mechanism results when the area of small piston 106 is established, for the particular fluid pressure being applied, so as to bias spool 85 to the left by a force that can be overcome by the application of about ten ounces of force on stylus 58.

In conducting a turning operation with the set up of FIG. 4, when the lower end 62 of stylus 58 moves forwardly with the stylus being pivoted on lower pivot pin 89, FIG. 6, stylus 58 will cease to exert a force on plunger 86, and spool 85 is urged towards the left position by the biasing action of piston 106. The tool slide has movement in the direction toward the work for the reason that chamber 78 (FIG. 12) is connected to exhaust via 96—95—94—90 thence from groove 90 via groove 130 (FIG. 14), 131 to exhaust 54. Movement of the tool slide inward is arrested when tracer finger is deflected slightly by the template and therefore the spool is in the center position wherein the fluid is locked in chamber 78 because passageway 96 (FIG. 12) communicates with groove 90 but cannot be exhausted to outlet port 54 (FIG. 14) since groove 90 does not communicate with 130, 131 and 54, even though pressure source 53 (FIG. 13) is connected to chamber 77 via passageway 79—80. The tool slide moves away from the work when spool 86 is in the right position. This is caused when the tracer finger is deflected by the pattern as when the slide and tracer are moving toward the workpiece and suddenly meets an abrupt change in pattern contour causing the tracer finger to be deflected about pivot 89 causing the valve spool 86 to be moved axially toward the right (FIG. 13) thus connecting pressure source via port 53 and via passageway 74—93—104 to spool groove 90, thence via (FIG. 12) passageway 94, 95, 96 to chamber 78 thereby causing a pressure build-up and moving the slide 35 away from the workpiece. It is to be noted chamber 77 (FIG. 13) also communicates with pressure source port 53 but due to the greater differential area of piston 36 exposed to chamber 78 the slide will move to the left as viewed in FIG. 13.

It will be understood that spool 85 need be shifted only a very minute distance to the left in order to establish communication between neck 91 and the annular passage 130 leading to reservoir 55. For example, the previously mentioned dimension of seven-tenths of a thousandth of an inch has been found to provide very precise operation. Hence the same sensitivity is achieved in extending upper carriage portion 28 as is achieved in retracting upper carriage portion 28 as previously described. It will now be understood that when spool 85 is in the centered position illustrated, pressurized neck 90 is delicately balanced in a precise centered position between the edge of a pressurized annular passage 91 communicating with pump 52 and the edge of a low pressure annular passage 130 leading to reservoir 55.

With reference to FIGS. 12 through 14, 17, and 18, spool 85 is hydraulically balanced by means of small passages 112 that extend through the body of the spool. Hence in the event that pressurized fluid should leak from pressurized annular chamber 90 to either a left chamber 114 or a right chamber 115 such chambers communicate with one another via passages 112 whereby the delicate balance of the spool is not disturbed and the hydraulic bias applied to the spool is not varied.

As is best seen in FIG. 14, any pressurized fluid that may leak from pressurized annular chamber 91, between the confronting surfaces of spool 85 and valve body 46, is returned to drain passage 72 either via annular chamber 117 and passage 119 or via annular chamber 118 and passage 119.

Referring next to the disposition of the control apparatus 45 for a boring operation, such as is illustrated in FIG. 3, a template 64–A is placed behind stylus 58 and lower pivot pin 89, FIG. 6, is removed from lower pivot mount 60 whereby stylus 58 pivots on upper pivot pin 88. To effect advancing of boring tool 41–A it is necessary to drain fluid from chamber 78, FIGS. 21 through 23, and maintain chamber 77 pressurized whereby cylinder 35 of fluid motor 33 is advanced relative to piston 36 which, as previously described, is maintained stationary relative to lower carriage portion 30. In order to adapt control apparatus 45 to drain chamber 78 it is only necessary to shift valve plate 47 forwardly, or to the right as viewed in FIGS. 21 through 23. Such shifting closes passages 79 and 95 through valve plate 47 since the ends of the passages will be covered by side walls 70 and 71 of the fluid motor and valve body. Shifting of valve plate 47 to the forward or boring position also places annular chamber 91 in communication with drain passage 72 via passage 123 in the valve plate and passage 124 in the valve body as will be understood from consideration of FIG. 23. At the same time, chamber 78 of the fluid motor is placed in communication with neck 90 via passage 125 in valve plate 47 and passage 94 in valve body 46 as seen in passage 125. Hence it will be understood that with valve plate 47 in the boring, or right position as viewed in FIGS. 21 through 23, movement of spool 85 to the right of the center position illustrated serves to drain chamber 78 to reservoir 55 via passages 96, 125, 94, and neck 91, FIG. 21, and annular chamber 91, passage 124, and passage 72, FIG. 23.

With reference to FIG. 22, it will be understood that when valve plate 47 is located in the forward or boring position chamber 77 is maintained pressurized via a passage 135 that connects passage 80 in the fluid motor with longitudinal pressurized passage 74 in valve plate 47.

In operation of the control apparatus 45 of FIGS. 21 through 23 in conducting a boring operation, when valve plate 47 is in the forward or boring position, forward movement of stylus 58, FIG. 3 by template 64–A moves plunger 86 inwardly whereby spool 85 is shifted to the right against the bias force of small piston 106, the latter being pressurized via a passage 128 in valve plate 47 that connects longitudinal pressurized passage 74 in the valve plate with passage 110 in the valve body when the valve plate 47 is in the forward or boring position. When spool 85 is moved a minute distance to the right of the center position, chamber 78 of the fluid motor is placed in communication with reservoir 55 via passages 96, 125, 94, and neck 90, FIG. 21 and annular passage 91 and passages 124, 123, and 72 of FIG. 23. When chamber 78 is placed in communication with reservoir 55, upon shifting of spool 85 to the right of center, chamber 77 of the fluid motor is maintained pressurized whereby the differential in pressure between chambers 77 and 78 extends cylinder 33 and upper carriage 28 forwardly and boring tool 41–A is extended relative to work piece 26–A.

When spool 85 is shifted to the left, however, with valve plate 47 in the forward or boring position of FIGS. 21 through 23, chamber 78 is pressurized via pump 52, passage 135, passage 136, annular passage 130, and neck 90, FIG. 22, and passages 94 and 96, FIG. 21. At the same time, chamber 77 is maintained pressurized via passages 74, 135, and 80, FIG. 22 and, due to the differential in area between ends 101 and 102 of piston 36, cylinder 35, upper carriage portion 28 and boring tool 41 are retracted relative to work piece 26–A. Hence it will be understood that with the boring set up of FIG. 3, control apparatus 45 serves to both extend and retract boring tool 26–A as required to duplicate the contour of a template such as 64–A.

With reference to FIGS. 12, 13, 14, and 17, the outer surface of spool 85 is provided with a plurality of small annular grooves 140 which serve to hydraulically balance spool 85 with respect to radially inwardly directed pressures exerted on the outer surface of the spool by fluid that leaks between the confronting surfaces of the spool and spool cylinder. It will be understood that if recesses 140 were not present the leakage of high pressure fluid into the space between the confronting surfaces of the spool and cylinder would not be uniformly distributed about the circumference of the spool whereby the spool would bind in the cylinder. When recesses 140 are provided, however, the leakage pattern becomes uniform about the circumference of spool 85 when recesses 140 fill up with high pressure fluid and the spool will then slide on rings of high pressure fluid formed by the pressurized fluid entrapped in recesses 140.

Figure 17:
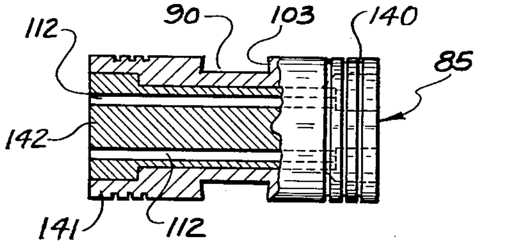
FIG. 17 is a side view, partially in section, of a spool comprising a portion of the control apparatus of the preceding figures, the section being taken along the line 17—17 of FIG. 18.
Figure 20:
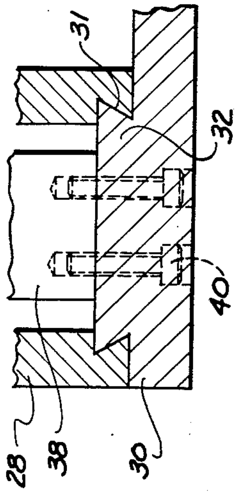
FIG. 20 is a partial rear sectional view of the carriage of FIG. 19 with the section being taken along the line 20—20 of FIG. 19.

As seen in FIG. 17, spool 85 is of a novel composite construction consisting of an outer cylindrical shell 141 formed of high speed steel or other long wearing metal and a core 142 formed of aluminum or other light weight metal. Such composite construction results in an extremely light spool of low inertia that can be very easily and rapidly shifted by a relatively light force exerted by the stylus or the previously described opposing hydraulic bias. In practice it has been found that spools weighing six ounces give extremely sensitive response to even minute changes in template contour.

As another important advantage of the present novel construction of spool 85 and its arrangement in the valve apparatus, no packing is utilized between the outer surface of spool 85 and the confronting surface of the spool cylinder whereby frictional resistance between the spool and spool cylinder is maintained at a minimum. Such low frictional resistance together with the lightness achieved by the composite spool construction and the hydraulic balance provided by passages 112 and recesses 140 combine to virtually eliminate resistance to spool movement whereby the extreme sensitivity of the mechanism is achieved.

Another important advantage of the present control apparatus resides in the fact that it is adapted for low pressure operation, i.e. the fluid pressure supplied by pump 52 need only be 150–250 p.s.i. as compared to 500 p.s.i. generally required for the operation of tracer mechanisms. As a result of such low pressures the control apparatus 45 operates at room temperature, whereby critical dimensions, such as the distance between recess edges 103 of the spool and edges 104 of the annular grooves 91 and 130 are not varied by thermally imposed expansion and contraction of the elements of the apparatus. With reference to FIGS. 12 through 14, the low pressure and hence low temperature operation of the apparatus is inherent in the novel design of the apparatus in that unrestricted flow can be achieved without the presence of any structural limitations on the volumetric flow potential. Specifically, the chamber formed by neck 90 of spool 85 can quickly receive and discharge relatively large volumetric flow rates from or to the relatively large annular recesses 91 or 130 on either side of neck 90. It will be understood that only a slight lateral shifting of spool 85 to the right or left of center quickly exposes a relatively large annular connection between neck 90 and annular recess 91 or 130 with such annular communication being continuous around the entire circumference of edges 103 and 104.

As still another advantage of the control apparatus 45 of the present invention, such mechanism is completely reversible in operation. By merely changing the stylus pivots 88 and 89, and by repositioning a single template from in front of the stylus 58, FIG. 4, to a position behind stylus 58, FIG. 3, the apparatus can be set up for a boring operation to provide an internal contour that conforms identically with an external contour formed with the same template. In addition, when the internal contour is being formed by automatic tracer operation the boring tool 41–A, FIG. 3, is retracted or moved rearwardly which is the normal direction of movement for a boring tool during an ordinary boring operation where tracer mechanisms are not employed.

While the form of embodiment of the present invention as herein disclosed constitutes a preferred form it is to be understood that other forms might be adopted, all coming within the scope of the claims which follow.

What is claimed is:

1. In a control system for a movable element or a cylinder member the combination of means forming a source of pressurized fluid; means forming a reservoir; a fluid motor including a cylinder and a side wall having a plurality of ports; a piston member in said cylinder and forming a first chamber communicating with certain of said ports and a second chamber communicating with certain other of said ports; valve means including a valve body having a side wall provided with a plurality of ports and a moveable flow control element moveable from a first position to a second position of from said first position to a third position; a plate means including a first side wall in slideable contact with said side wall of said fluid motor and provided with a plurality of ports, a second side wall in slideable contact with said side wall of said valve means and provided with a plurality of ports, a longitudinal passage communicating with said source and certain of said ports, and a second longitudinal passage communicating with said reservoir and certain of said ports, said plate means including a first position wherein movement of said flow control element from said first position to said second position connects a certain port of said fluid motor to said source, and said plate means including a second position wherein movement of said flow control element from said first position to said second position drains said certain port of said fluid motor; a member operatively connected to said flow control element for movement of said element in one direction from said first position; and a means for urging said flow control element in the other direction.

2. In a control system for a movable element or a cylinder member the combination of means forming a source of pressurized fluid; means forming a reservoir; a fluid motor including a side wall having a plurality of ports; valve means including a valve body having a side wall provided with a plurality of ports and a moveable flow control element moveable from a first position to a second position or from said first position to a third position; a plate means including a first side wall in slideable contact with said side wall of said fluid motor and provided with a plurality of ports, a second side wall in slideable contact with said side wall of said valve means and provided with a plurality of ports, a longitudinal passage communicating with said source and certain of said ports, and a second longitudinal passage communicating with said reservoir and certain of said ports, said plate means including a first position wherein movement of said flow control element from said first position to said second position connects a certain port of said fluid motor to said source, and said plate means including a second position wherein movement of said flow control element from said first position to said second position drains said certain port of said fluid motor; a rod slideably carried by said valve means and including one end in engagement with said moveable element and the other end extending to the exterior of said valve means; a member in contact with said other end of said rod for moving said rod in one direction; and means for urging said flow control element in the other direction.

3. Control apparatus comprising, in combination, a fluid motor including a side wall having a plurality of ports; valve means including a valve body having a side wall provided with a plurality of ports and a spool moveable from a first position to a second position or from said first position to a third position; a plate means including a first side wall in slideable contact with said side wall of said fluid motor and provided with a plurality of ports, a second side wall in slideable contact with said side wall of said valve means and provided with a plurality of ports, a longitudinal passage communicating with said source and certain of said ports, and a second longitudinal passage communicating with said reservoir and certain of said ports, said plate means including a first position wherein movement of said spool from said first position to said second position connects a certain port of said fluid motor to a source of pressurized fluid, and said plate means including a second position wherein movement of said spool from said first position to said second position drains said certain port of said fluid motor; means forming a necked portion on said spool for receiving pressurized fluid from said source; means forming a second annular passage in the inner surface of said valve cylinder, said second annular passage being disposed between said first passage means and an end of said spool; a port in the side wall of said valve body for draining said second annular passage; a member operatively connected to said spool for movement of said spool from said first position to one of said second and third positions; and means for urging said spool towards the other of said second and third positions.

4. A control apparatus for establishing the path of a tool in conformity with the shape of a template, said apparatus comprising, in combination, a fluid motor including a side wall having a plurality of ports; valve means including a valve body having a side wall provided with a plurality of ports and a spool moveable from a first position to a second position or from said first position to a third position; a plate means including a first side wall in slideable contact with said side wall of said fluid motor and provided with a plurality of ports, a second side wall in slideable contact with said side wall of said valve means and provided with a plurality of ports, a longitudinal passage communicating with said source and certain of said ports, and a second longitudinal passage communicating with said reservoir and certain of said ports, said plate means including a first position wherein movement of said spool from said first position to said second position connects a certain port of said fluid motor to a source of pressurized fluid, and said plate means including a second position wherein movement of said spool from said first position to said second position drains said certain port of said fluid motor; means forming a passage through said spool for connecting the interior of said valve cylinder on one end of said spool with the interior of said valve cylinder on the other end of said spool; a member operatively connected to said spool for movement of said spool from said first position to one of said second and third positions; and means for urging said spool towards the other of said second and third positions.

5. A control apparatus for establishing the path of a tool in conformity with the shape of a template, said apparatus comprising, in combination, means forming a source of pressurized fluid; a fluid motor including a side wall having a plurality of ports; valve means including a valve body having a side wall provided with a plurality of ports and a moveable flow control element moveable from a first position to a second position or from said first position to a third position; a plate means including a first side wall in slideable contact with said side wall of said fluid motor and provided with a plurality of ports, a second side wall in slideable contact with said side wall of said valve means and provided with a plurality of ports, a longitudinal passage communicating with said source and certain of said ports, and a second longitudindal passage communicating with said reservoir and certain of said ports, said plate means including a first position wherein movement of said flow control element from said first position to said second position connects a certain port of said fluid motor to a source of pressurized fluid, and said plate means including a second position wherein movement of said flow control element from said first position to said second position drains said certain port of said fluid motor; a member operatively connected to said flow control element for movement of said element from said first position to one of said second and third positions; and a member moveably carried by said valve means and in engagement with said flow control element, said member including a surface exposed to pressurized fluid from said source.

6. A control apparatus comprising, in combination, a valve body including an inner cylindrical surface provided with two spaced recesses having spaced inner edges; means forming a source of pressurized fluid; means forming a drain; a control element having an outer surface slideably engagging said cylindrical surface and provided with a recess having two outer edges each of which is spaced a minute distance inwardly from a respective one of said inner edges of said valve body recesses; a fluid motor including first and second chambers separated by a moveable wall; passage means connecting one of said chambers with said recess in said control element; passage means connecting the other of said chambers with said source; passage means connecting said fluid motor with said valve body; contour sensing means operatively connected to said control element for moving said element in one direction; hydraulically actuated means for moving said control element in the other direction; and reversing means including a moveable element disposable in a forward operating position wherein said first passage means connects said source with said one recess and said second passage means connects said other recess with said drain.

7. A control apparatus comprising, in combination, a valve body including an inner cylindrical surface provided with two spaced recesses having spaced inner edges; means forming a source of pressurized fluid; means forming a drain; a control element having an outer surface slideably engaging said cylindrical surface and provided with a recess having two outer edges each of which is spaced a minute distance inwardly from a respective one of said inner edges of said valve body recesses; a fluid motor including first and second chambers separated by a moveable wall; passage means connecting one of said chambers with said recess in said control element; passage means connecting the other of said chambers with said source; passage means connecting said fluid motor with said valve body; contour sensing means operatively connected to said control element for moving said element in one direction; a moveable member carried by said valve body and in engagement with said control element, said member including a surface exposed to pressurized fluid from said source whereby said control element is hydraulically biased in the other direction; and reversing means interposed between said valve body and said fluid motor, said reversing means including a moveable element disposable in a forward operating position wherein said first passage means connects said source with said one recess and said second passage means connects said other recess with said drain.

8. A control apparatus comprising, in combination, a valve body including an inner cylindrical surface provided with two spaced recesses having spaced inner edges; means forming a source of pressurized fluid; means forming a reservoir; a first passage means connecting said source with one of said recesses; a second passage means connecting said reservoir with the other of said recesses, reversing valve means for interchanging said first and second passage means connections whereby said source communicates with said other recess and said reservoir communicates with said one recess; a control element having an outer surface slideably engaging said cylindrical surface and provided with a recess having two outer edges each of which is spaced a minute distance inwardly from a respective one of said inner edges of said valve body recesses; a fluid motor; passage means connecting said fluid motor with said valve body; contour sensing means operatively connected to said control element for moving said element in one direction; and means for moving said element in one direction; and means for moving said control element in the other direction, said reversing means being provided by a plate mounted between said valve body and said fluid motor, said plate being slideable between forward and reverse positions for interchanging said passage means.

9. A flow control system comprising, in combination, means for supplying pressurized fluid; means forming a reservoir; a fluid motor including a cylinder, a piston having a first side and a second side one of said sides being of greater area than the other of said sides, and first and second ports each of which ports communicates with said cylinder on a respective side of said piston; conduit means connecting said second port of said fluid motor with said source of pressurized fluid; valve means including a casing containing a moveable flow control element, said element including a first position wherein said valve means isolates said first port from said pressurized fluid and reservoir, a second position wherein said valve means connects said first port with said pressurized fluid, and a third position wherein said valve means connects said first port with said reservoir; a member moveably carried by said casing and operatively associated with said flow control element for movement of said element from said first position to said second position; a second member moveably carried by said casing and operatively associated with said flow control element for urging said flow control element towards said third position; and a moveable reversing member operative between said fluid motor and said valve means and including a plurality of passages selectively connectable between said valve means and said first port of said fluid motor, said reversing member including a first position wherein shifting of said flow control element to said second position connects said first port of said fluid motor with said reservoir and wherein shifting of said flow control element to said third position connects said first port of said fluid motor with said pressurized fluid.

10. A flow control system comprising, in combination, means for supplying pressurized fluid; means forming a reservoir; a fluid motor including a cylinder, a piston having a first side and a second side one of said sides being of greater area than the other of said sides, and first and second ports each of which ports communicates with said cylinder on a respective side of said piston; conduit means connecting said second port of said fluid motor with said source of pressurized fluid; valve means including a casing containing a movable flow control element, said element including a first position wherein said valve means isolates said first port from said pressurized fluid and reservoir, a second position wherein said valve means connects said first port with said pressurized fluid, and a third position wherein said valve means connects said first port with said reservoir; a member moveably carried by said casing and operatively associated with said flow control element for movement of said element from said first position to said second position; means forming a chamber in said casing; conduit means connecting said chamber with said source of pressurized fluid; a second member slidably mounted in said casing, said member including one end in engagement with said flow control element and another end exposed to the pressurized fluid in said chamber; and a moveable reversing member operative between said fluid motor and said valve means and including a plurality of passages selectively connectable between said valve means and said first port of said fluid motor, said reversing member including a first position wherein shifting of said flow control element to said second position connects said first port of said fluid motor with said reservoir and wherein shifting of said flow control element to said third position connects said first port of said fluid motor with said pressurized fluid.

11. A flow control system comprising, in combination, means for supplying pressurized fluid; means forming a reservoir; a fluid motor including a cylinder, a piston having a first side and a second side one of said sides being of greater area than the other of said sides, and first and second ports each of which ports communicates with said cylinder on a respective side of said piston; conduit means connecting said second port of said fluid motor with said source of pressurized fluid; valve means including a casing containing a movable flow control element, said element including a first position wherein said valve means isolates said first port from said pressurized fluid and reservoir, a second position wherein said valve means connects said first port with said pressurized fluid, and a third position wherein said valve means connects said first port with said reservoir; a rod slidably carried by said casing and including one end in engagement with said flow control element and the other end extending to the exterior of said casing; a lever pivotally mounted relative to said casing and in operative engagement with said other end of said rod for axially moving said rod in one direction; means forming a chamber for pressurized fluid; conduit means connecting said chamber with said source; a second rod slidably carried by said casing and including a first end engaging said movable flow control element and a second end exposed to the pressurized fluid in said chamber; and a movable reversing member operative between said fluid motor and said valve means and including a plurality of passages selectively connectable between said valve means and said first port of said fluid motor, said reversing member including a first position wherein shifting of said flow control element to said second position connects said first port of said fluid motor with said reservoir and wherein shifting of said flow control element to said third position connects said first port of said fluid motor with said pressurized fluid.

12. A flow control system comprising, in combination, means for supplying pressurized fluid; means forming a reservoir; a fluid motor including a cylinder, a piston having a first side and a second side one of said sides being of greater area than the other of said sides, and first and second ports each of which ports communicates with said cylinder on a respective side of said piston; conduit means connecting said second port of said fluid motor with said source of pressurized fluid; valve means including a valve body forming a valve cylinder; a spool carried in said valve cylinder and including a first position wherein said valve means isolates said first port from said pressurized fluid and reservoir, a second position wherein said valve means connects said first port with said pressurized fluid, and a third position wherein said valve means connects said first port with said reservoir; means forming a passage through said spool for connecting the interior of said valve cylinder on one end of said spool with the interior of said valve cylinder on the other end of said spool; a rod member slidably carried by said valve body and including a first end in engagement with an end of said spool and a second end extending to the exterior of said valve body; a second rod member slidably carried by said casing and including a first end engaging the other end of said spool and a second end forming a surface; conduit means for supplying pressurized fluid to said second end of said second rod member; and a movable reversing member operative between said fluid motor and said valve means and including a plurality of passages selectively connectable between said valve means and said first port of said fluid motor, said reversing member including a first position wherein shifting of said spool to said second position connects said first port of said fluid motor with said reservoir and wherein shifting of said spool to said third position connects said first port of said fluid motor with said pressurized fluid.

13. A flow control system comprising, in combination, means for supplying pressurized fluid; means forming a reservoir; a fluid motor including a cylinder, a piston having a first side and a second side one of said sides being of greater area than the other of said sides, and first and second ports each of which ports communicates with said cylinder on a respective side of said piston; conduit means connecting said second port of said fluid motor with said source of pressurized fluid; valve means including a valve body forming a valve cylinder; a spool carried in said valve cylinder and including a first position wherein said valve means isolates said first port from said pressurized fluid and reservoir, a second position wherein said valve means connects said first port with said pressurized fluid, and a third position wherein said valve means connects said first port with said reservoir; means forming a passage through said spool for connecting the interior of said valve cylinder on one end of said spool with the interior of said valve cylinder on the other end of said spool; a rod member slidably carried by said valve body and including a first end in engagement with an end of said spool and a second end extending to the exterior of said valve body; means forming a chamber in said valve body; conduit means connecting said chamber with said source; a rod slidably carried in said valve body and including a first end engaging the other end of said spool and a second end having a surface exposed to pressurized fluid in said chamber; a lever pivotally mounted relative to said valve body in operative engagement with said first rod member; and a movable reversing member operative between said fluid motor and said valve means and including a plurality of passages selectively connectable between said valve means and said first port of said fluid motor, said reversing member including a first position wherein shifting of said spool to said second position connects said first port of said fluid motor with said reservoir and wherein shifting of said spool to said third position connects said first port of said fluid motor with said pressurized fluid.

14. A control apparatus comprising, in combination, a stationary valve body including valve chamber and an inner cylindrical surface provided with two spaced recesses having spaced inner edges; means forming a source of pressurized fluid; means forming a drain; a control element having an outer surface slideably engaging said cylindrical surface and provided with a recess having two outer edges each of which is spaced a minute distance inwardly from a respective one of said inner edges of said valve body recesses; fluid motor casing means forming a motor cylinder; piston means separating said motor cylinder into first and second chambers; an actuating rod on said piston means and extending to the exterior of said fluid motor casing means; passage means connecting one of said chambers with said recess in said control element; passage means connecting the other of said chambers with said source; passage means connecting said source and drain with said valve body; contour sensing means operatively connected to said control element for moving said element in one direction; hydraulically actuated means for moving said control element in the other direction; and a passage means extending longitudinally through said control element for connecting said valve chamber on one side of said control element with said valve chamber on the other side of said control element.

15. A control apparatus comprising, in combination, a stationary valve body including valve chamber and an inner cylindrical surface provided with two spaced recesses having spaced inner edges; means forming a source of pressurized fluid; means forming a drain; a control element having an outer surface slideably engaging said cylindrical surface and provided with a recess having two outer edges each of which is spaced a minute distance inwardly from a respective one of said inner edges of said valve body recesses; fluid motor casing means forming a motor cylinder; piston means separating said motor cylinder into first and second chambers; an actuating rod on said piston means and extending to the exterior of said fluid motor casing means; passage means connecting one of said chambers with said recess in said control element; passage means connecting the other of said chambers with said source; passage means connecting said source and drain with said valve body; a first plunger member slideably extended through one end of said valve body and engaging one end of said control element; contour sensing means including a lever pivotally mounted to said one end of said valve body and engaging said first plunger member; a second plunger member extended through the other end of said valve body and including an inner end engaging the other end of said control element and an outer surface exposed to a source of pressurized fluid; and passage means extending longitudinally through said control element for the passage of fluid between opposite ends of said valve chamber.

16. A control apparatus comprising, in combination, a stationary valve body including a valve cylinder, an annular high pressure recess, an annular low pressure recess, a first end wall provided with a first plunger bore and a second end wall provided with a second plunger bore; a spool in said valve cylinder and including an annular recess normally centered between said high and low pressure recesses in said valve body, said spool including a passage connecting said valve cylinder on one end of said spool with said valve cylinder on the other end of said spool; a first pluger member disposed in said first plunger bore and engaging one end of said spool; contour sensing means including a lever engaging said first plunger member; a second plunger member disposed in said second plunger bore and engaging the other end of said spool, said second plunger member including a surface exposed to pressurized fluid for biasing said spool towards said first plunger member; fluid motor casing means forming a motor cylinder; piston means in said motor cylinder and including a rod portion extending to the exterior of said motor cylinder, said motor cylinder including a first motor chamber of smaller cross sectional area and a second motor chamber of larger cross sectional area; passage means through said motor casing means for connecting said first motor chamber with a source of pressurized fluid; passage means through said valve body and motor casing means for connecting said normally centered annular recess in said spool with said second motor chamber; passage means connecting said high pressure recess with a source of pressurized fluid; and passage means forming a drain for said low pressure recess.

17. A control apparatus and fluid motor unit comprising, in combination, a stationary valve body including a valve cylinder, an annular high pressure recess, an annular low pressure recess, a first end wall provided with a first plunger bore, a second end wall provided with a second plunger bore, and a side wall forming a first passage portion; a spool in said valve cylinder and including an annular recess communicating with said first passage portion and normally centered between said high and low pressure recesses in said valve body, said spool including a passage connecting said valve cylinder on one end of said spool with said valve cylinder on the other end of said spool; a first plunger member disposed in said first plunger bore and engaging one end of said spool; contour sensing means including a lever engaging said first plunger member; a second plunger member disposed in said second plunger bore and engaging the other end of said spool, said second plunger member including a surface exposed to pressurized fluid for biasing said spool towards said first plunger member; fluid motor casing means forming a motor cylinder; piston means in said motor cylinder and including a rod portion extending to the exterior of said motor cylinder, said motor cylinder including a first motor chamber of smaller cross sectional area and a second motor chamber of larger cross sectional area, said motor casing means including a second passage portion connecting said second motor chamber with said first passage portion in said valve body; means connecting said motor casing means to said valve body; passage means through said motor casing means for connecting said first motor chamber with a source of pressurized fluid; passage means connecting said high pressure recess with a source of pressurized fluid; and passage means forming a drain for said low pressure recess.

References Cited in the file of this patent

UNITED STATES PATENTS

| | | |
|---|---|---|
| 752,491 | Warren | Feb. 16, 1904 |
| 1,231,257 | Herr | June 26, 1917 |
| 2,101,712 | Johnsen | Dec. 7, 1937 |
| 2,618,244 | Roehm | Nov. 18, 1952 |